US012736949B2

(12) United States Patent
Hashizume

(10) Patent No.: US 12,736,949 B2
(45) Date of Patent: Sep. 15, 2026

(54) CONTROLLER AND THREE-DIMENSIONAL MODELING APPARATUS

(71) Applicant: SEIKO EPSON CORPORATION, Tokyo (JP)

(72) Inventor: Keitaro Hashizume, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 673 days.

(21) Appl. No.: 18/319,942

(22) Filed: May 18, 2023

(65) Prior Publication Data

US 2023/0376009 A1 Nov. 23, 2023

(30) Foreign Application Priority Data

May 19, 2022 (JP) ................................ 2022-082121

(51) Int. Cl.

| | |
|---|---|
| ***G05B 19/416*** | (2006.01) |
| ***B29C 64/393*** | (2017.01) |
| ***B33Y 30/00*** | (2015.01) |
| ***G05B 19/41*** | (2006.01) |
| *B33Y 50/02* | (2015.01) |

(52) U.S. Cl.

CPC .......... *G05B 19/416* (2013.01); *B29C 64/393* (2017.08); *G05B 19/41* (2013.01); *B33Y 50/02* (2014.12); *G05B 2219/49023* (2013.01)

(58) Field of Classification Search

None

See application file for complete search history.

(56) References Cited

U.S. PATENT DOCUMENTS

| | | | | |
|---|---|---|---|---|
| 9,278,474 | B1 * | 3/2016 | Chang | B33Y 30/00 |
| 10,073,424 | B2 * | 9/2018 | Lin | G06F 30/20 |
| 10,088,823 | B2 * | 10/2018 | Yamaguchi | G05B 19/423 |

(Continued)

FOREIGN PATENT DOCUMENTS

| | | |
|---|---|---|
| JP | 2020-059219 A | 4/2020 |

OTHER PUBLICATIONS

Keles et al. "Tuning the Center of Gravity of 3D printed Artifacts", Jun. 11-14, 2018, Elsevier B.V., FAIM2018, pp. 371-378 (Year: 2018).*

*Primary Examiner* — Ariel Mercado-Vargas

(74) *Attorney, Agent, or Firm* — WORKMAN NYDEGGER

(57) ABSTRACT

A controller includes a processor controlling a three-dimensional modeling apparatus including a stage, an injection unit injecting a modeling material, and a movement unit relatively moving the stage and the injection unit, and a memory unit in which modeling path information and correspondence information are stored, wherein the modeling path information is information representing respective modeling paths of N modeling layers, the correspondence information is information in which overlap extent information representing an extent of overlap of the modeling paths and velocity information representing a relative movement velocity of the injection unit to the stage are correlated, the processor performs modeling control to model a three-dimensional modeled object by stacking the N modeling layers, and the modeling control includes movement velocity control to determine the movement velocity when the respective N modeling layers are formed by the injection unit based on the modeling path information and the correspondence information.

9 Claims, 8 Drawing Sheets

(56) References Cited

U.S. PATENT DOCUMENTS

| | | | | |
|---|---|---|---|---|
| 2007/0179657 | A1* | 8/2007 | Holzwarth | B29C 64/106 700/187 |
| 2017/0123407 | A1* | 5/2017 | Shiihara | G05B 19/4099 |
| 2017/0274575 | A1* | 9/2017 | Meshorer | B33Y 10/00 |
| 2018/0264742 | A1* | 9/2018 | Yang | B29C 64/118 |
| 2019/0030822 | A1* | 1/2019 | Touma | B33Y 50/02 |
| 2021/0387401 | A1* | 12/2021 | Rumjahn | B29C 64/295 |
| 2023/0294170 | A1* | 9/2023 | Takushima | B33Y 50/02 219/73.21 |

* cited by examiner

PROCESSOR
41
MEMORY UNIT
42
INPUT RECEIVING UNIT
43
COMMUNICATION UNIT
44
DISPLAY UNIT
45
TO INJECTION UNIT, MOVEMENT UNIT, DATA GENERATOR

A(n-1, k) A(n-1, k+1)

S3 Ss

E3 S4 E4

PP3

ZD3

Y

ZD4 PP4

Z X

CONTROLLER AND THREE-DIMENSIONAL MODELING APPARATUS

The present application is based on, and claims priority from JP Application Serial Number 2022-082121, filed May 19, 2022, the disclosure of which is hereby incorporated by reference herein in its entirety.

BACKGROUND

1. Technical Field

The present disclosure relates to a controller and a three-dimensional modeling apparatus.

2. Related Art

Research and development of a three-dimensional modeling apparatus modeling a three-dimensional modeled object by stacking of layers of a modeling material, which is at least partially molten, are conducted. Here, for example, the three-dimensional modeling apparatus models a single three-dimensional modeled object by injecting the modeling material on a stage and stacking N modeling layers formed of the injected modeling material on the stage.

In this regard, JP-A-2020-059219 discloses a three-dimensional modeling apparatus, when stacking an n layer on an (n−1) layer, stacking the n layer in a direction different from a direction of a modeling path of the (n−1) layer. N is an integer equal to or larger than 1. Further, n is one integer from 1 to N. The n layer refers to the nth modeling layer of the N modeling layers.

However, when forming the modeling path of the n layer along a direction different from the direction of the modeling path of the (n−1) layer, it may be difficult for the three-dimensional modeling apparatus to fix the n layer on the (n−1) layer.

SUMMARY

In order to solve the above described problem, an aspect of the present disclosure is a controller including a processor controlling a three-dimensional modeling apparatus including a stage, an injection unit injecting a modeling material onto the stage, and a movement unit relatively moving the stage and the injection unit, and a memory unit in which modeling path information and correspondence information are stored, wherein the modeling path information is information representing respective modeling paths of N modeling layers formed using the modeling material injected from the injection unit, N is an integer equal to or larger than 1, the correspondence information is information in which overlap extent information representing an extent of overlap of the modeling paths and velocity information representing a relative movement velocity of the injection unit to the stage are correlated, the processor performs modeling control to model a three-dimensional modeled object in a predetermined shape by injecting the modeling material onto the stage using the injection unit and stacking the N modeling layers, and the modeling control includes movement velocity control to determine the movement velocity when the respective N modeling layers are formed by the injection unit based on the modeling path information and the correspondence information.

Further, an aspect of the present disclosure is a controller including a processor controlling a three-dimensional modeling apparatus including a stage, an injection unit injecting a modeling material onto the stage, and a movement unit relatively moving the stage and the injection unit, and a memory unit in which modeling path information and correspondence information are stored, wherein the modeling path information is information representing respective modeling paths of N modeling layers formed using the modeling material injected from the injection unit, N is an integer equal to or larger than 1, the correspondence information is information in which overlap extent information representing an extent of overlap of the modeling paths and width information representing a width of the modeling path are correlated, the processor performs modeling control to model a three-dimensional modeled object in a predetermined shape by injecting the modeling material onto the stage using the injection unit and stacking the N modeling layers, and the modeling control includes width control to determine the width of the modeling path when the respective N modeling layers are formed by the injection unit based on the modeling path information and the correspondence information.

Furthermore, an aspect of the present disclosure is a three-dimensional modeling apparatus including a stage, an injection unit injecting a modeling material onto the stage, a movement unit relatively moving the stage and the injection unit, and a controller, wherein the controller includes a processor controlling the injection unit and the movement unit, and a memory unit in which modeling path information and correspondence information are stored, the modeling path information is information representing respective modeling paths of N modeling layers formed using the modeling material injected from the injection unit, N is an integer equal to or larger than 1, the correspondence information is information in which overlap extent information representing an extent of overlap of the modeling paths and velocity information representing a relative movement velocity of the injection unit to the stage are correlated, the processor performs modeling control to model a three-dimensional modeled object in a predetermined shape by injecting the modeling material onto the stage using the injection unit and stacking the N modeling layers, and the modeling control includes movement velocity control to determine the movement velocity when the respective N modeling layers are formed by the injection unit based on the modeling path information and the correspondence information.

DESCRIPTION OF EXEMPLARY EMBODIMENTS

Embodiments

As below, embodiments of the present disclosure will be explained with reference to the drawings.

Outline of Three-Dimensional Modeling Apparatus

First, an outline of a three-dimensional modeling apparatus according to an embodiment is explained.

The three-dimensional modeling apparatus according to the embodiment includes a stage, an injection unit, a movement unit, and a controller. The injection unit injects a modeling material onto the stage. The movement unit relatively moves the stage and the injection unit. The controller includes a processor and a memory unit. The processor controls the injection unit and the movement unit. In the memory unit, modeling path information and correspondence information are stored. Here, the modeling path information is information representing respective modeling paths of N modeling layers formed using the modeling material injected from the injection unit. N is an integer equal to or larger than 1. The correspondence information is information in which overlap extent information representing an extent of overlap of the modeling paths and velocity information representing a relative movement velocity of the injection unit to the stage are correlated. The processor performs modeling control to model a three-dimensional modeled object in a predetermined shape by injecting the modeling material onto the stage using the injection unit and stacking the N modeling layers. The modeling control includes movement velocity control to determine the movement velocity when the respective N modeling layers are formed by the injection unit based on the modeling path information and the correspondence information. Thereby, the three-dimensional modeling apparatus may form the N modeling layers at the movement velocity according to the extent of overlap of the modeling paths and, as a result, lowering of the interlayer strength between the modeling layers stacked by the three-dimensional modeling apparatus may be suppressed.

As below, a configuration of the three-dimensional modeling apparatus according to the embodiment, a configuration of a controller of the three-dimensional modeling apparatus, and processing performed by the controller will be explained.

Configuration of Three-Dimensional Modeling Apparatus

As below, the configuration of the three-dimensional modeling apparatus according to the embodiment will be explained using a three-dimensional modeling apparatus 1 as an example.

Figure 1:
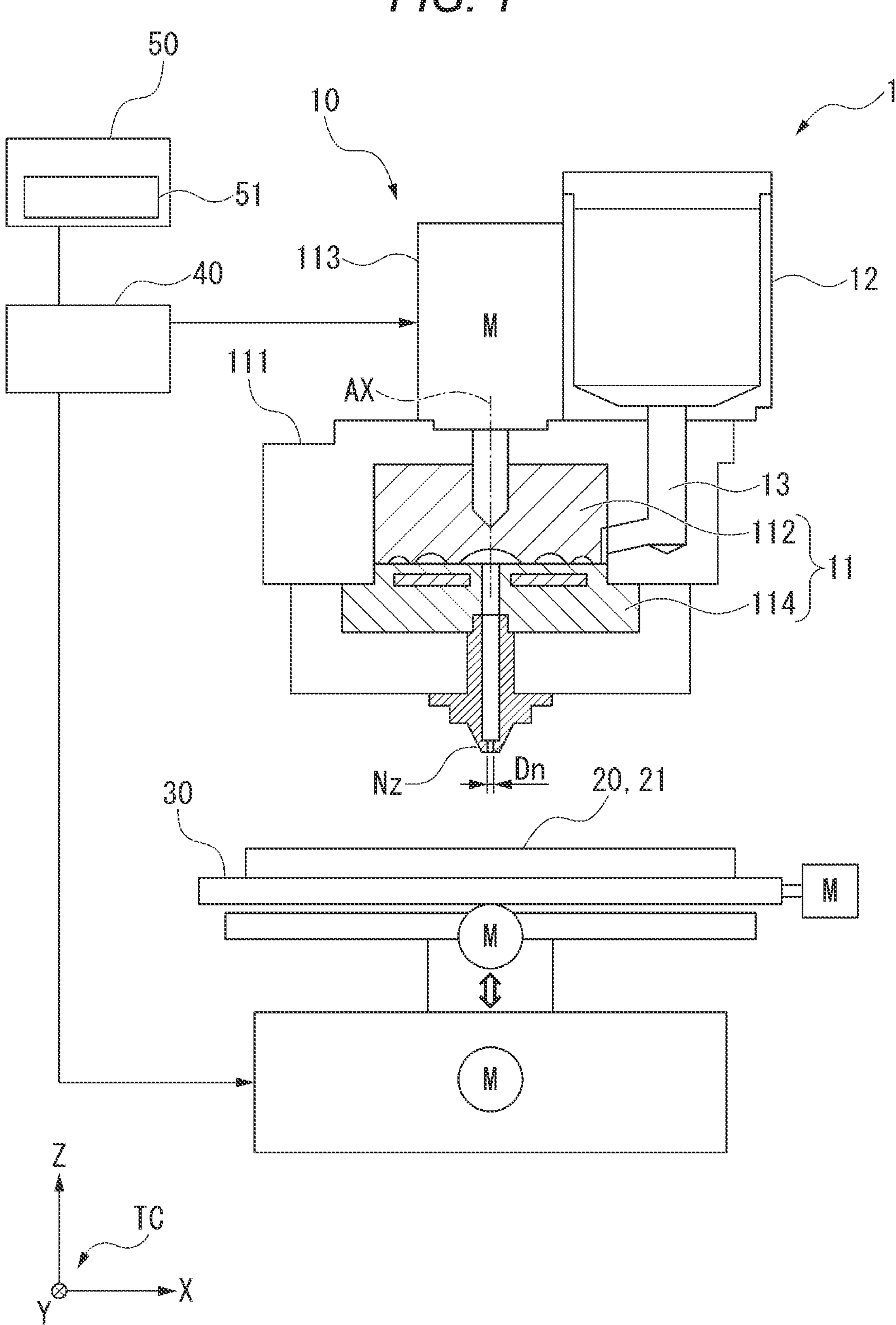
FIG. 1 shows an example of a configuration of a three-dimensional modeling apparatus 1.

FIG. 1 shows an example of a configuration of the three-dimensional modeling apparatus 1.

Here, a three-dimensional coordinate system TC is a three-dimensional orthogonal coordinate system showing directions in the drawings in which the three-dimensional coordinate system TC is drawn. Hereinafter, for convenience of explanation, an X-axis in the three-dimensional coordinate system TC is simply referred to as "X-axis". Further, hereinafter, for convenience of explanation, a Y-axis in the three-dimensional coordinate system TC is simply referred to as "Y-axis". Furthermore, hereinafter, for convenience of explanation, a Z-axis in the three-dimensional coordinate system TC is simply referred to as "Z-axis". As below, as an example, a case where the negative direction of the Z-axis is the same as the direction of gravity force will be explained. Accordingly, hereinafter, for convenience of explanation, the positive direction of the Z-axis is referred to as "upward direction" or simply as "upper" or the negative direction of the Z-axis is referred to as "downward direction" or simply as "lower". Further, hereinafter, for convenience of explanation, the upward direction and the downward direction are referred to as "upward and downward directions".

The three-dimensional modeling apparatus 1 includes an injection unit 10 having a nozzle Nz, a stage 20 having a modeling surface 21 on which a three-dimensional modeled object is modelled, a movement unit 30, and a controller 40. Further, in the three-dimensional modeling apparatus 1, the controller 40 is communicably coupled to a data generator 50. Note that the three-dimensional modeling apparatus 1 may include the data generator 50 with the injection unit 10, the stage 20, the movement unit 30, and the controller 40.

The three-dimensional modeling apparatus 1 changes relative positions of the injection unit 10 and the stage 20 while injecting a modeling material X (not shown) from the injection unit 10 onto the modeling surface 21 of the stage 20. Thereby, the three-dimensional modeling apparatus 1 models a single three-dimensional modeled object by stacking N modeling layers formed using the modeling material X injected from the injection unit 10. Here, N may be any integer equal to or larger than 1. Further, the modeling layer refers to the modeling material X formed in layers by injection of the modeling material X along a modeling path parallel to the modeling surface 21. The modeling path refers to a scanning path with respect to the stage 20 of the nozzle Nz moving while injecting the modeling material X. In other words, the modeling path is a scanning path relatively moving along the modeling surface 21 of the stage 20 for the nozzle Nz moving while injecting the modeling material X. In the respective N modeling layers, the modeling materials X forming the modeling layers may be continuously connected or divided into pieces. Note that, hereinafter, for convenience of explanation, the nth modeling layer of the N modeling layers is referred to as "n layer". In this case, for example, the (n−1) layer is the (n−1)th layer of the N modeling layers. n is an integer from 1 to N.

The injection unit 10 is an example of the above described injection unit. The injection unit 10 is an injector injecting the modeling material X onto the modeling surface 21. More specifically, the injection unit 10 has a material melting section 11 generating the modeling material X by melting one or more kinds of materials and a material feeding section 12 with the above described nozzle Nz. Here, in the injection unit 10, the material feeding section 12 and the material melting section 11 are coupled by a feed path 13. The material melting section 11 and the nozzle Nz are coupled by a communication hole 14. Accordingly, the nozzle Nz communicates with the material melting section 11 via the communication hole 14. The nozzle Nz injects the modeling material X fed from the material melting section 11 through the communication hole 14 from the tip.

The material feeding section 12 contains one or more kinds of materials in a state of pellets or powder. As below, as an example, a case where the materials contained in the material feeding section 12 are pelletized ABS (acrylonitrile butadiene styrene) resins will be explained. Note that the materials contained in the material feeding section 12 may be other one or more kinds of materials in place of the ABS resins. The material feeding section 12 includes e.g., a hopper. The material contained in the material feeding section 12 is fed to the material melting section 11 via the feed path 13 provided at the downside of the material feeding section 12.

The material melting section 11 includes a screw case 111, a flat screw 112 housed within the screw case 111, a drive motor 113 driving the flat screw 112, and a barrel 114 fixed at the downside of the flat screw 112 within the screw case 111.

The flat screw 112 is a screw having a flattened cylindrical shape with a spiral groove portion from the outer circumference of the cylinder to a center axis AX of the cylinder formed in the bottom surface of the cylinder.

The communication hole 14 is provided in the barrel 114. A heater is provided inside of the barrel 114. The temperature of the heater is controlled by the controller 40.

At least a part of the material fed between the rotating flat screw 112 and the barrel 114 is melted by the rotation of the flat screw 112 and heating by the heater provided inside of the barrel 114 into the paste modeling material X having fluidity. The modeling material X is fed to the nozzle Nz through the communication hole 14 provided in the barrel 114 by the rotation of the flat screw 112. Then, the modeling material X fed to the nozzle Nz is injected from the tip of the nozzle Nz toward the stage 20.

The movement unit 30 changes the relative positions of the nozzle Nz of the injection unit 10 and the stage 20. More specifically, the movement unit 30 changes the relative positions of the nozzle Nz of the injection unit 10 and the stage 20 by moving one or both of the injection unit 10 and the stage 20. As below, as an example, a case where the movement unit 30 changes the relative positions of the nozzle Nz of the injection unit 10 and the stage 20 by moving the stage 20 will be explained. For example, the movement unit 30 includes a three-axis positioner moving the stage 20 in directions respectively parallel to the X directions, the Y directions, and the Z directions by drive forces of three motors. In this case, the three motors are controlled by the controller 40. Note that, hereinafter, for convenience of explanation, the relative velocity of the injection unit 10 to the stage 20 is simply referred to as "movement velocity".

The controller 40 controls the entire of the three-dimensional modeling apparatus 1. The controller 40 acquires and stores three-dimensional modeling data generated by the data generator 50 via a network or a recording medium. The controller 40 executes a prestored three-dimensional modeling program, and thereby, performs modeling control to control motions of the injection unit 10 and the movement unit 30 according to the prestored three-dimensional modeling data and models a three-dimensional modeled object. Note that the controller 40 may be configured by a combination of circuits, not a computer.

Figure 2:
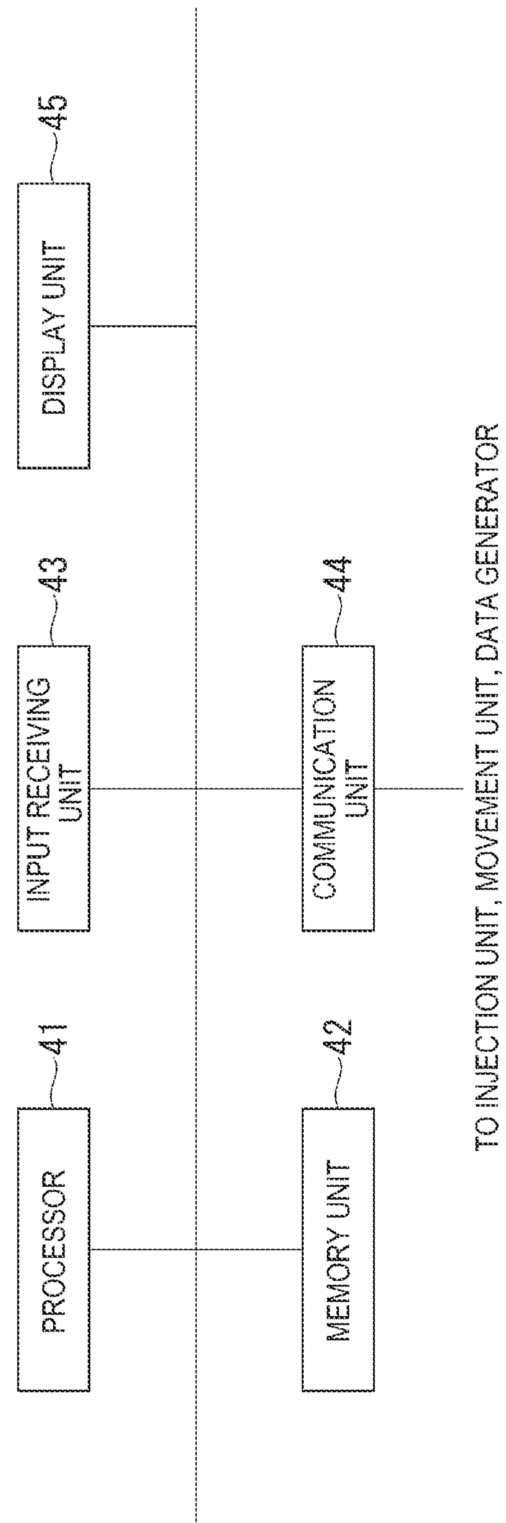
FIG. 2 shows an example of a configuration of a controller 40.

FIG. 2 shows an example of the configuration of the controller 40. The controller 40 includes a processor 41, a memory unit 42, an input receiving unit 43, a communication unit 44, and a display unit 45. Note that the controller 40 may be an information processing device formed separately from the three-dimensional modeling apparatus 1. In this case, the three-dimensional modeling apparatus 1 is communicably connected to the information processing device and controlled by the information processing device.

The processor 41 is e.g., a CPU (Central Processing Unit). Note that the processor 41 may be another processor such as an FPGA (Field Programmable Gate Array). Or, the processor 41 may include a plurality of processors. The processor 41 realizes various functions of the three-dimensional modeling apparatus 1 by executing various programs, various commands, etc. stored in the memory unit 42. Accordingly, processing described as processing performed by the controller 40 in the embodiment is processing performed by the processor 41.

The memory unit 42 includes an HDD (Hard Disk Drive), an SSD (Solid State Drive), an EEPROM (Electrically Erasable Programmable Read Only Memory), a ROM (Read Only Memory), and a RAM (Random Access Memory). Note that the memory unit 42 may be an external memory device coupled by a digital input/output port such as a USB (Universal Serial Bus) or the like in place of the device provided inside of the three-dimensional modeling apparatus 1. The memory unit 42 stores various programs, various commands, various kinds of information, etc. processed by the three-dimensional modeling apparatus 1. For example, the memory unit 42 stores the above described three-dimensional modeling data, correspondence information, etc. The correspondence information refers to information representing a relationship between a contact area between the n layer and the (n−1) layer and the movement velocity of the injection unit 10. In other words, the correspondence information is information containing information in which contact area information representing the contact area between the n layer and the (n−1) layer and velocity information representing the movement velocity of the injection unit 10 are correlated. The contact area information is an example of overlap extent information representing an extent of overlap between modeling paths. That is, the contact area between the n layer and the (n−1) layer is an example of the extent of overlap between modeling paths.

The input receiving unit 43 receives an operation from a user performed while viewing an image displayed on the display unit 45. The input receiving unit 43 is an input device including e.g., a keyboard, a mouse, and a touch pad. Note that the input receiving unit 43 may be a touch panel integrally formed with the display unit 45.

The communication unit 44 includes e.g., a digital input/output port such as a USB and an Ethernet (registered trademark) port.

The display unit 45 displays an image. The display unit 45 is a display device including e.g., a liquid crystal display panel, an organic EL (Electro Luminescence) display panel as a display of the three-dimensional modeling apparatus 1.

The data generator 50 is a device generating three-dimensional modeling data used for modeling of a three-dimensional modeled object by the three-dimensional modeling apparatus 1. The data generator 50 includes a computer having one or more processors, a memory, and an input/output interface externally inputting and outputting signals. The data generator 50 includes a data generation unit 51. The data generation unit 51 generates three-dimensional modeling data containing path data showing a modeling path with respect to each of the N modeling layers. The controller 40 controls the injection unit 10 and the movement unit 30 to model the three-dimensional modeled object on the stage 20 according to the three-dimensional modeling data generated by the data generation unit 51.

The data generation unit 51 generates the three-dimensional modeling data using shape data such as three-dimensional CAD (Computer Aided Design) data representing the shape of the three-dimensional modeled object. That is, the three-dimensional modeling data is data used for stacking of N modeling layers by the three-dimensional modeling apparatus 1. Specifically, the three-dimensional modeling data contains the path data and injection control data showing an injection amount of the modeling material X by the injection unit 10. As described above, the modeling path shown by the path data refers to a scanning path on the stage 20 of the nozzle Nz moving while injecting the modeling material X. The data generation unit 51 is realized by the processor provided in the data generator 50 executing a predetermined program stored in the memory of the data generator 50. The program may be recorded in a computer-readable non-transitory physical recording medium.

Here, the modeling path includes one or more partial paths. The respective partial paths are linear paths. The injection control data is individually correlated with the respective partial paths. In the embodiment, an injection amount shown by injection control data correlated with a certain partial path refers to an amount of the modeling material X injected per unit time in the partial path. Note that a total amount of the modeling material X injected in the entire partial path may be correlated with each partial path as the injection control data.

Figure 3:
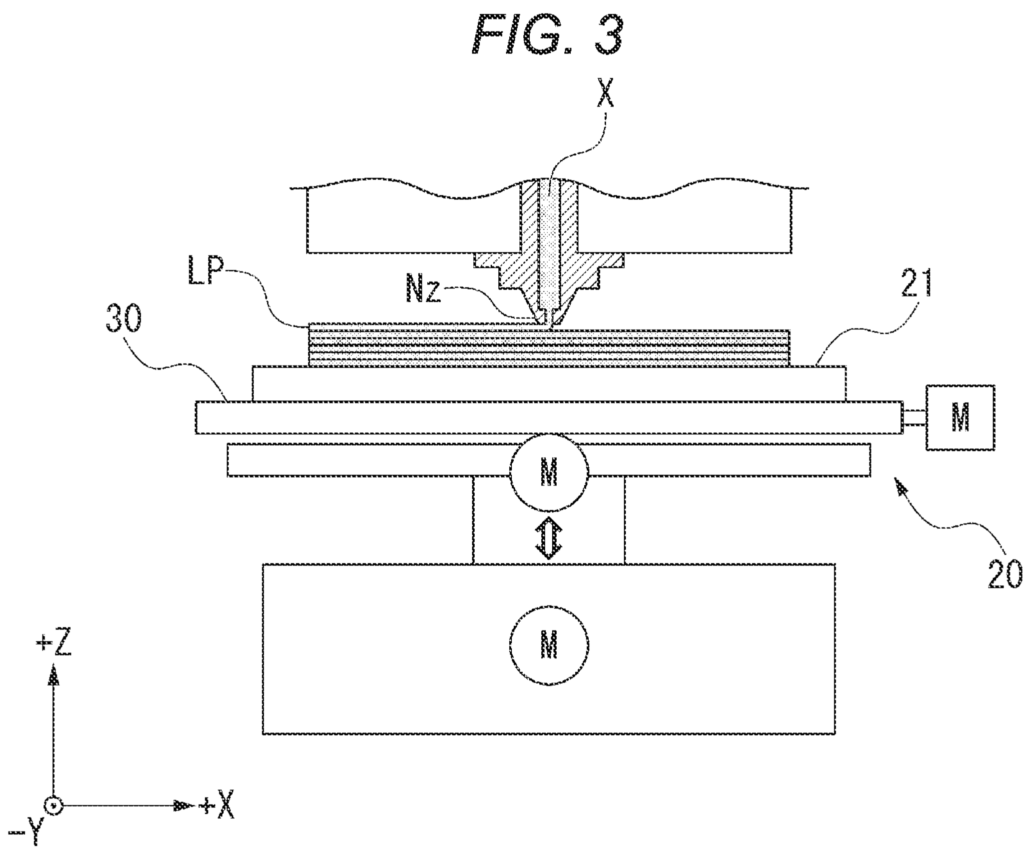
FIG. 3 is a diagram schematically showing modeling of a three-dimensional modeled object in the three-dimensional modeling apparatus 1.

FIG. 3 is a diagram schematically showing modeling of a three-dimensional modeled object in the three-dimensional modeling apparatus 1. In the three-dimensional modeling apparatus 1, as described above, in the material melting section 11, the solid-state raw material fed to the groove portion of the rotating flat screw 112 is melted and the modeling material X is generated. When a certain modeling layer is formed, the controller 40 controls the nozzle Nz to inject the modeling material X while changing the position of the nozzle Nz with respect to the stage 20 along the modeling path for the modeling layer with the distance between the modeling surface 21 of the stage 20 and the nozzle Nz held. The modeling material X injected from the nozzle Nz is continuously deposited in the movement direction of the nozzle Nz. In FIG. 3, a linear portion LP as a modeled portion linearly extending along the modeling path of the nozzle Nz is modeled as at least a part of the modeling layer by the scanning using the nozzle Nz.

The controller 40 forms the modeling layers by repeating scanning using the above described nozzle Nz. After forming one modeling layer, the controller 40 moves the position of the nozzle Nz with respect to the stage 20 in the Z direction. Then, on the previously formed modeling layers, modeling layers are further stacked, and thereby, the three-dimensional modeled object is modeled.

For example, when moving the nozzle Nz in the Z direction after the formation of the single modeling layer is completed, in a case where there are a plurality of modeling areas mutually divided in each layer or the like, the controller 40 may temporarily pause the injection of the modeling material X from the nozzle Nz. In this case, the controller 40 reduces the rotation speed of the flat screw 112 and stops the injection of the modeling material X from the nozzle Nz. The controller 40 raises the rotation speed of the flat screw 112 after changing the position of the nozzle Nz, and thereby, restarts deposition of the modeling material X from the changed position of the nozzle Nz.

Figure 4:
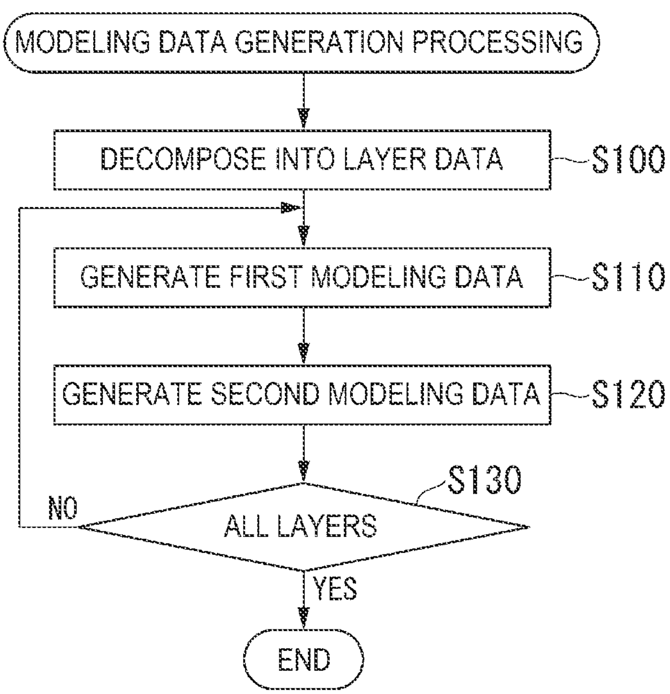
FIG. 4 shows an example of a flowchart of modeling data generation processing executed by the controller 40.
Figure 5:
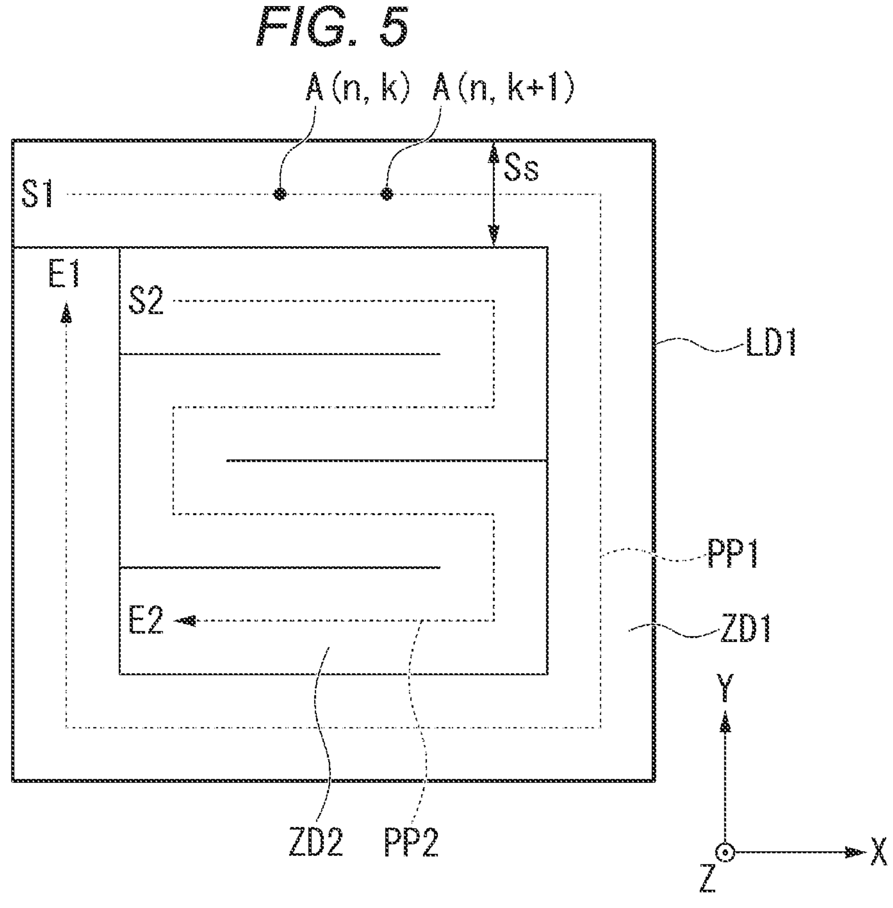
FIG. 5 shows an example of a planar shape of an n layer of the three-dimensional modeled object.

FIG. 4 shows an example of a flowchart of modeling data generation processing executed by the data generator 50. The processing is processing for generating the three-dimensional modeling data used for modeling of the three-dimensional modeled object prior to modeling of the three-dimensional modeled object. FIG. 5 shows an example of a planar shape of the n layer of the three-dimensional modeled object.

As shown in FIG. 4, at step S100, the data generation unit 51 analyzes three-dimensional CAD data as an example of the externally input shape data of the three-dimensional modeled object and generates layer data of slices of the three-dimensional modeled object along the XY-plane in N layers. The layer data is data showing the outer shell of the three-dimensional modeled object on the XY-plane. FIG. 5 shows the example in which the rectangular outer shell is shown by the layer data using thick lines LD1.

The layer data shown in FIG. 5 includes first modeling data and second modeling data.

The first modeling data refers to data for formation of an outer shell region in contact with the inside of the outer shell shown by the layer data. The outer shell region refers to a region affecting the appearance of the three-dimensional modeled object. The first modeling data contains path data showing the modeling path for modeling the outermost periphery along the outer shell of the three-dimensional modeled object. That is, the first modeling data is shown by the modeling path for modeling the outermost periphery along the outer shell of the three-dimensional modeled object. Note that the first modeling data may contain not only the path data showing the modeling path for modeling the outermost periphery of the three-dimensional modeled object but also the path data showing the modeling path including one loop inside of the outer periphery. The number of loops of the modeling path for forming the outer shell region can be arbitrarily set.

The second modeling data refers to data for modeling an inner region as another region than the outer shell region at inside of the outer shell represented by the layer data. The inner region is a region having a larger influence on the strength of the three-dimensional modeled object than the appearance of the three-dimensional modeled object. The second modeling data contains path data showing the modeling path for modeling the inner region as the other region than the outer shell region at inside of the outer shell represented by the layer data. That is, the second modeling data is represented by the modeling path for modeling the inner region as the other region than the outer shell region at inside of the outer shell represented by the layer data.

FIG. 5 shows the example in which first modeling data ZD1 is represented by the outermost modeling path. The modeling path includes a plurality of partial paths PP1 for modeling the outer shell region. As described above, the respective partial paths PP1 are linear paths. Therefore, in FIG. 5, the first modeling data ZD1 is represented by continuous four partial paths PP1 shown by broken lines from a start point shown by "S1" to an end point shown by "E1". The respective partial paths PP1 are correlated with injection control data showing injection amounts for forming the modeling material X deposited on the stage 20 in a predetermined reference width Ss.

FIG. 5 shows the example in which second modeling data ZD2 is represented by a modeling path meandering in S-shapes. The data generation unit 51 generates data showing the modeling path filling the inner region as the second modeling data ZD2 by reciprocating the injection unit 10 along the X directions and gradually moving the injection unit 10 in the Y directions orthogonal to the X directions in the XY-plane. The modeling path filling the inner region includes a plurality of partial paths PP2. As described above, the respective partial paths PP2 are linear paths. Therefore, in FIG. 5, the second modeling data ZD2 is represented by five partial paths PP2 from a start point shown by "S2" to an end point shown by "E2". The respective partial paths PP2 are correlated with injection control data showing injection amounts for forming the modeling material X deposited on the stage 20 in a predetermined reference width Ss. Note that, in the embodiment, both the width of the modeling path modeled in the first modeling data ZD1 and the width of the modeling path modeled in the second modeling data ZD2 are the reference widths Ss, however, these may be different widths.

In FIG. 5, the end point "E1" of the modeling path represented by the first modeling data ZD1 and the start point "S2" of the modeling path represented by the second modeling data ZD2 are shown in different positions, however, this is for the convenience of the illustration and these positions are actually the same position. Therefore, the modeling path represented by the first modeling data ZD1 and the modeling path represented by the second modeling data ZD2 are continuously coupled. Note that these modeling paths may be divided. That is, the end point "E1" of the modeling path represented by the first modeling data ZD1 and the start point "S2" of the modeling path represented by the second modeling data ZD2 may be in different positions.

At step S110, the data generation unit 51 generates the first modeling data.

At step S120, the data generation unit 51 generates the second modeling data.

Here, the data generation unit 51 performs the processing from step S110 to step S120 with respect to each of the N pieces of layer data generated at step S100. Thereby, the data generation unit 51 may generate the first modeling data and the second modeling data forming the respective N pieces of layer data. Hereinafter, for convenience of explanation, the first modeling data generated at step S110 and the second modeling data generated at step S120 are collectively referred to as "intermediate data". The intermediate data has path data showing a modeling path in which the injection unit 10 moves while injecting the modeling material X by a plurality of partial paths, injection control data showing injection amounts of the modeling material X in the respective partial paths, partial path width data showing widths of the respective partial paths, and partial path thickness data showing thicknesses of the respective partial paths. Note that the partial path width data may be calculated from the injection control data at the respective steps, which will be described later. Or, the partial path thickness data may be calculated from the path data, the injection control data, and the partial path width data at the respective steps to be described later.

At step S130, the data generation unit 51 determines whether the above described processing is completed with respect to all layer data. When the processing is not finished with respect to all layer data, the data generation unit 51 repeats processing from step S110 to step S130 with respect to the next layer data. When the generation of the modeling data is completed with respect to all layer data, the data generation unit 51 ends the processing of the flowchart shown in FIG. 4, i.e., the modeling data generation processing.

Figure 6:
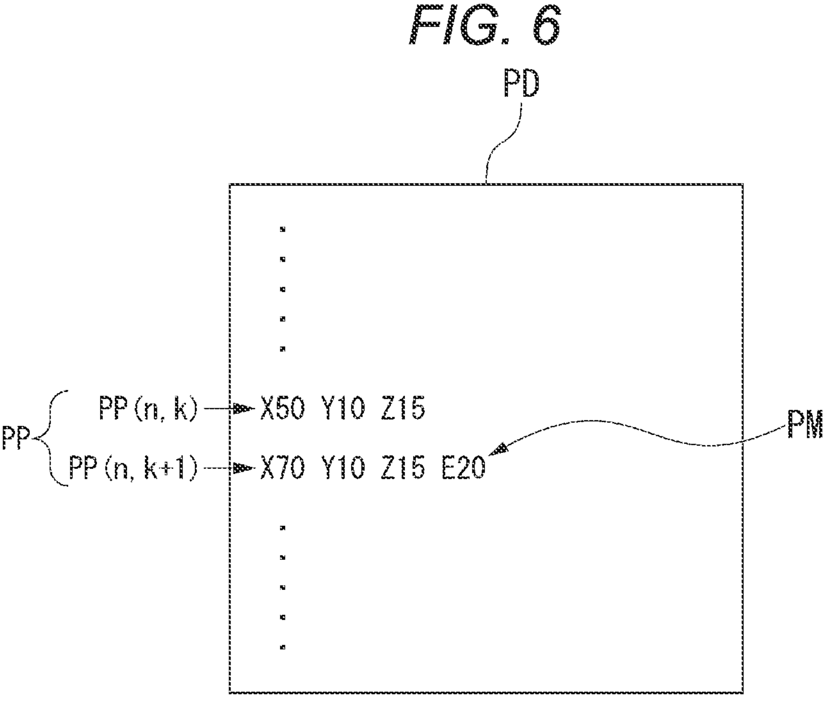
FIG. 6 is a diagram showing an example of path data (PD) in intermediate data generated in FIG. 4.

FIG. 6 is a diagram showing an example of path data PD in the intermediate data generated in FIG. 4. Information described in the path data PD is read sequentially from the top to the bottom in FIG. 6 and interpreted. The path data PD contains a path parameter PP for identification of the partial path included in the modeling path and an injection parameter PM for identification of the injection control data in the intermediate data. Note that the path data PD may contain other data in addition to the parameters. The path data PD is an example of modeling path information.

The path parameter PP designates coordinates (X,Y,Z) at which the nozzle Nz is to be located next of a coordinate system with the coordinate axes along the X, Y, Z directions on the modeling surface 21 of the stage 20. In the path data PD, one partial path is identified by a set of two path parameters PP (n,k), PP (n, k+1) arranged in an anterior-posterior direction. n as an argument for the path parameter PP is an index designating the layer formed by the path parameter PP. That is, the partial path identified by the set of path parameters PP (n,k), PP (n, k+1) is a partial path included in the modeling path for forming the n layer. Further, k is an arbitrary natural number showing the order of sequence of the path parameters PP in the path data PD. Here, specifically, the partial path is a unit of the modeling path and refers to a path of one section formed by sectioning of the movement of the nozzle Nz when the modeling layer is modeled by a unidirectional linear movement from arbitrary coordinates to the next coordinates.

As below, as an example, a case where the path parameter PP (n,k) shown in FIG. 6 is a path parameter at a location A(n,k) of the modeling path shown in FIG. 5 and the path parameter PP (n,k+1) shown in FIG. 6 is a path parameter at a location A(n,k+1) of the modeling path shown in FIG. 5 will be explained. The path parameter PP (n,k) is shown by coordinates (50,10,15) and the path parameter PP (n,k+1) is shown by coordinates (70,10,15). That is, by the path parameter PP (n,k) and the path parameter PP (n,k+1), a partial path in which the nozzle Nz moves in the X direction by a predetermined unit distance of +20 from the location A(n,k) to the location A(n,k+1) of the modeling path. In this manner, the path data PD is interpreted to contain data showing the partial path showing the movement direction and the movement distance of the nozzle Nz.

The injection parameter PM is attached to the posterior of the path parameter PP in the path data PD. The injection parameter PM is attached to the posterior of a path parameter PP designates the injection amount of the modeling material X injected while the nozzle Nz moves to the coordinates shown by the path parameter PP. That is, the injection parameter PM indicates a total amount of the modeling material X placed on the stage 20 with the movement of the nozzle Nz shown by the modeling path contained in the path data PD.

In the example in FIG. 6, an integer value indicating the injection amount of the modeling material X shown by a predetermined unit amount is attached to the posterior of an alphabet "E" showing the injection parameter PM. In this example, injection of the modeling material X in the 20 unit amounts is designated while the nozzle Nz is moved from the coordinates (50,10,15) to the coordinates (70,10,15).

Figure 7:
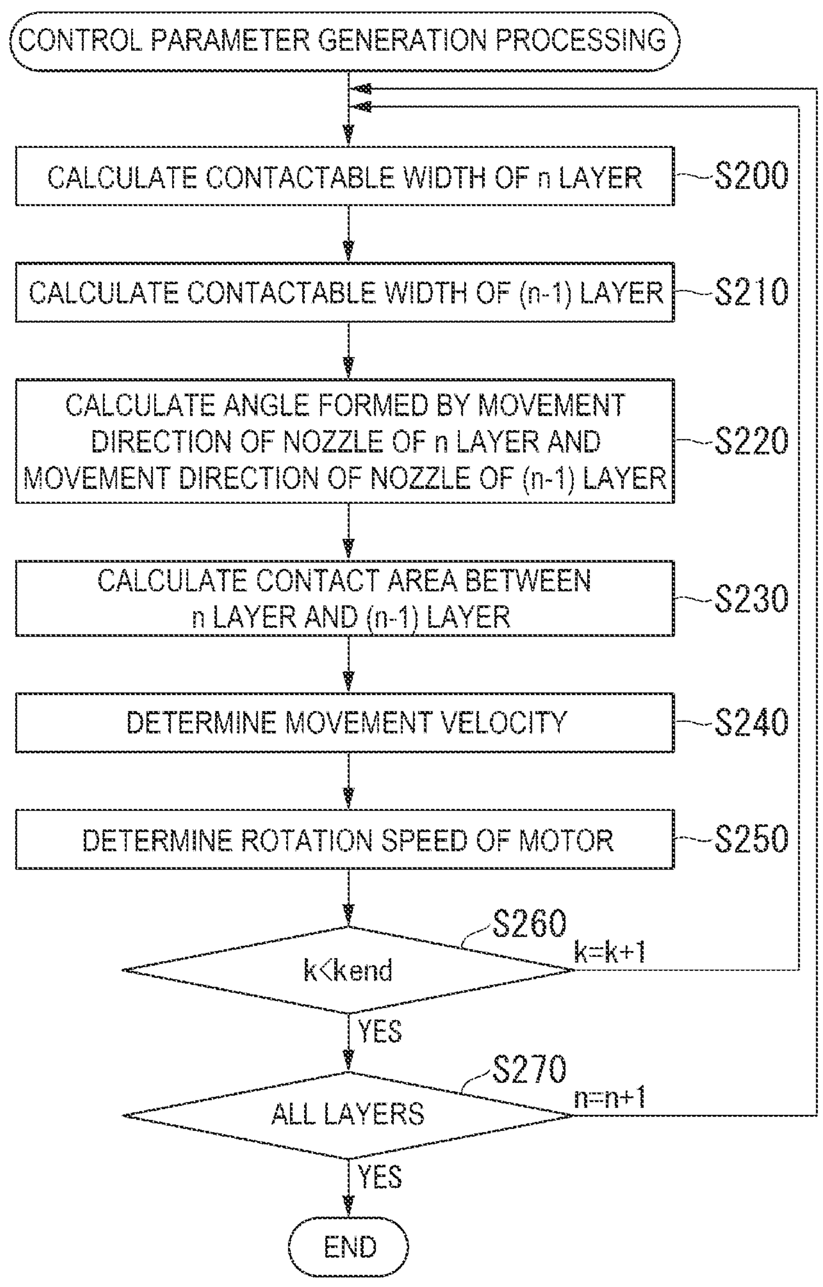
FIG. 7 shows an example of a flowchart of control parameter generation processing executed by the controller 40.
Figures 8, 9:
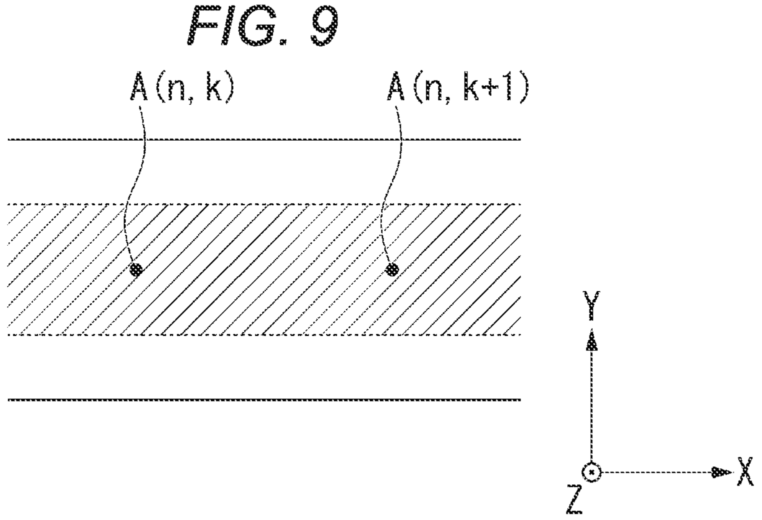
FIG. 8 shows an example of a planar shape of an (n−1) layer placed under the n layer shown in FIG. 5.
FIG. 9 is a diagram showing an area S when an angle formed by a movement direction of a nozzle Nz at a location A (n,k) and a movement direction of the nozzle Nz at a location A (n−1,k) is 0 degrees.

FIG. 7 shows an example of a flowchart of control parameter generation processing executed by the controller 40. The processing is processing for generating a control parameter used for controlling the injection unit 10 and the movement unit 30 by the controller 40 based on the three-dimensional modeling data. Here, in FIG. 7, as an example, a case where an initial value of n is 1 is explained. FIG. 8 shows an example of a planar shape of the (n−1) layer placed under the n layer shown in FIG. 5.

The layer data shown in FIG. 8 includes first modeling data and second modeling data.

FIG. 8 shows the example in which first modeling data ZD3 is shown by the outermost modeling path. The modeling path includes a plurality of partial paths PP3 for modeling the outer shell region. As described above, the respective partial paths PP3 are linear paths. Therefore, in FIG. 8, the first modeling data ZD3 is represented by continuous four partial paths PP3 shown by broken lines from a start point shown by "S3" to an end point shown by "E3". The respective partial paths PP3 are correlated with injection control data showing injection amounts for forming the modeling material X deposited on the stage 20 in a predetermined reference width Ss.

FIG. 8 shows the example in which second modeling data ZD4 is represented by a modeling path meandering in S-shapes. The data generation unit 51 generates data showing the modeling path filling the inner region as the second modeling data ZD4 by reciprocating the injection unit 10 along the Y directions and gradually moving the injection unit 10 in the X directions orthogonal to the Y directions in the XY-plane. The modeling path filling the inner region includes a plurality of partial paths PP4. As described above, the respective partial paths PP4 are linear paths. Therefore, in FIG. 8, the second modeling data ZD4 is represented by five partial paths PP4 from a start point shown by "S4" to an end point shown by "E4". The respective partial paths PP4 are correlated with injection control data showing injection amounts for forming the modeling material X deposited on the stage 20 in a predetermined reference width Ss. Note that, in the embodiment, both the width of the modeling path modeled in the first modeling data ZD3 and the width of the modeling path modeled in the second modeling data ZD4 are the reference widths Ss, however, these may be different widths.

In FIG. 8, the end point "E3" of the modeling path represented by the first modeling data ZD3 and the start point "S4" of the modeling path represented by the second modeling data ZD4 are shown in different positions, however, this is for the convenience of the illustration and these positions are actually the same position. Therefore, the modeling path represented by the first modeling data ZD3 and the modeling path represented by the second modeling data ZD4 are continuously coupled. Note that these modeling paths may be divided. That is, the end point "E3" of the modeling path represented by the first modeling data ZD3 and the start point "S4" of the modeling path represented by the second modeling data ZD4 may be in different positions.

At step S200, the controller 40 calculates a contactable width of a bottom surface at the location A (n,k) based on the partial path width data. The contactable width is e.g., an 80% width of the width shown by the partial path width data at the location A (n,k). Note that the contactable width may be calculated from the injection amount parameter, the path thickness data, and the path width data. Or, for example, the contactable width may be a width smaller than 80% of the width shown by the partial path width data at the location A (n,k) or a width larger than 80% of the width shown by the partial path width data at the location A (n,k).

At step S210, the controller 40 calculates a contactable width of the front surface at the location A (n−1,k) based on the partial path width data. The X coordinate and the Y coordinate at the location A (n−1,k) are the same as the X coordinate and the Y coordinate at the location A (n,k). That is, as seen from the Z direction, the location A (n−1,k) and the location A (n,k) overlap. Further, the position where the location A (n−1,k) and the location A (n, k) overlap may be also referred to as "overlap position".

At step S220, the controller 40 calculates an angle formed by the movement direction of the nozzle Nz at the location A (n,k) and the movement direction of the nozzle Nz at the location A (n−1,k). Specifically, the controller calculates the angle from a vector of the location A (n,k) and the location A (n,k+1) and a vector of the location A (n−1,k) and the location A (n−1,k+1). Note that the movement direction of the nozzle Nz at the location A (n,k) is an example of the direction of the modeling path in each position on the modeling path of a second modeling layer. Further, the movement direction of the nozzle Nz at the location A (n−1,k) is an example of the direction of the modeling path in each position on the modeling path of a first modeling layer.

The vector of the location A (n,k) and the location A (n,k+1) is a value (10,0,0) obtained by subtraction of the path parameter PP (n,k) from the path parameter PP (n,k+1). The vector of the location A (n−1,k) and the location A (n−1,k+1) is a value (10,0,0) obtained by subtraction of a path parameter PP (n−1,k) from a path parameter PP (n−1, k+1). Therefore, the angle formed by the vector of the location A (n,k) and the location A (n,k+1) and the vector of the location A (n−1,k) and the location A (n−1,k+1) is 0 degrees.

At step S230, the controller 40 calculates an area S where the layer data at the location A (n,k) contacts the layer data at the location A (n−1,k). FIG. 9 is a diagram showing the area S when the angle formed by the movement direction of the nozzle Nz at the location A (n,k) and the movement direction of the nozzle Nz at the location A (n−1,k) is 0 degrees. Note that, in FIG. 9, the area S is shown as an area within the hatched region. The area S is calculated based on the contactable width of the bottom surface at the location A (n,k), the contactable width of the front surface at the location A (n−1,k), the angle formed by the movement direction of the nozzle Nz at the location A (n,k) and the movement direction of the nozzle Nz at the location A (n−1,k), the path data, and/or the partial path width data. In the embodiment, the area S is a value obtained by multiplication of the smaller value of the contactable width of the bottom surface at the location A (n,k) and the contactable width of the front surface at the location A (n−1,k) by the value obtained by subtraction of the path parameter PP (n,k) from the path parameter PP (n,k+1).

Figure 10:
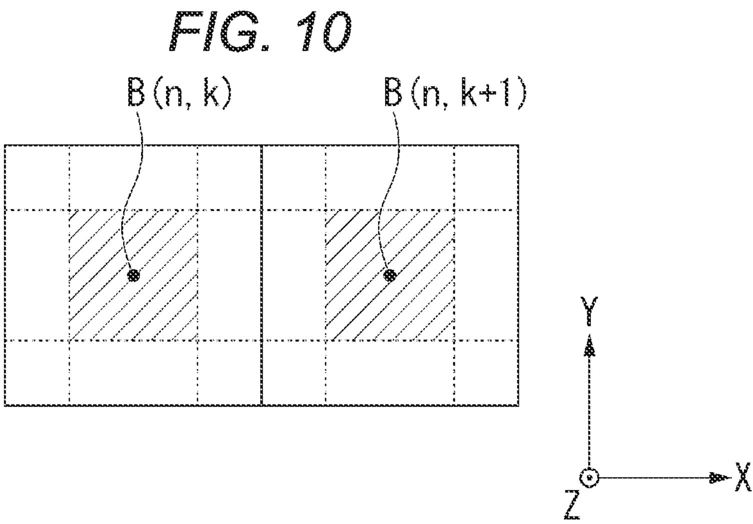
FIG. 10 is a diagram showing an area S when an angle formed by a movement direction of the nozzle Nz at a location B (n,k) and a movement direction of the nozzle Nz at a location B (n−1,k) is 90 degrees.

For example, the area S changes according to the angle formed by a movement direction of the nozzle Nz at a location of the n layer and a movement direction of the nozzle Nz at a location of the (n−1) layer. FIG. 10 is a diagram showing an area S when an angle formed by a movement direction of the nozzle Nz at a location B (n,k) and a movement direction of the nozzle Nz at a location B (n−1,k) is 90 degrees. Note that, in FIG. 10, the area S is shown as an area within the hatched region. The area S is a value obtained by multiplication of a contactable width of the bottom surface at the location B (n,k) by a contactable width of the front surface at the location B (n−1,k).

When the angle is 45 degrees, the area S is a value obtained by division of the value by multiplication of the contactable width of the bottom surface at the location of the n layer by the contactable width of the front surface at the location of the (n−1) layer by sine of the angle formed by the movement direction of the nozzle Nz at the location of the n layer and the movement direction of the nozzle Nz at the location of the (n−1) layer.

At step S240, the controller 40 determines a relative movement velocity of the injection unit 10 to the stage 20. Specifically, the controller 40 determines the relative movement velocity of the injection unit 10 to the stage 20 from the area S based on the correspondence information representing the relationship between a contact area between the n layer and the (n−1) layer and the movement velocity of the injection unit 10. Note that the correspondence information may be information in a table form containing a plurality of records correlating contact area information with velocity information, a function correlating contact area information with velocity information, or information in another form correlating contact area information with velocity information.

At step S250, the controller 40 determines the rotation speed of the flat screw 112. For example, the controller 40 determines the rotation speed of the flat screw 112 based on the injection control data and the movement velocity. In FIG. 7, the processing at step S250 is shown by "DETERMINE ROTATION SPEED OF MOTOR".

Here, the controller 40 repeatedly executes the processing from step S200 to step S250 with respect to each value of k as the argument of the path parameter PP. That is, the controller 40 repeatedly executes the processing from step S200 to step S250 with respect to each value of k as the argument of the path parameter PP sequentially from the processing from step S200 to step S250 for k=1, the processing from step S200 to step S250 for k=2, . . . . Thereby, the controller 40 may determine the relative movement velocity of the injection unit 10 to the stage 20 with respect to each of the plurality of partial paths.

At step S260, the controller 40 determines whether the processing from step S200 to step S250 is completed in the path data in the n layer. That is, at step S260, the controller 40 determines whether the processing from step S200 to step S250 is executed with respect to all values of k. In FIG. 7, the processing at step S260 is shown by "k<kend".

When the controller 40 determines that the processing is not completed at step S260, the controller 40 executes the processing from step S200 to step S260 with respect to the next value of k.

When the controller 40 determines that the processing is completed at step S260, the controller 40 ends the repetition of the processing from step S200 to step S260. Then, the controller 40 goes to step S270 and selects the next value of n, i.e., the next modeling layer. Note that, when there is no unselected modeling layer at step S270, the controller 40 ends the repetition of the processing from step S200 to step S270. In FIG. 7, the processing at step S270 is shown by "ALL LAYERS".

According to the above described three-dimensional modeling apparatus 1 of the embodiment, the relative movement velocity of the injection unit 10 to the stage 20 is set based on the contact area between the (n−1) layer and the n layer. Here, a relationship between the angle formed by the movement direction of the nozzle Nz at the location of the n layer and the movement direction of the nozzle Nz at the location of the (n−1) layer with the contact area between the (n−1) layer and the n layer is explained. Many of the sections of the partial paths have circular shapes, oval shapes, rounded polygonal shapes, or the like. Accordingly, in the three-dimensional modeling apparatus 1, even when the distance between the tip of the nozzle Nz injecting the modeling material X and the modeling surface 21 is set to be equal to or smaller than the inner diameter of the nozzle Nz and the modeling material X is crushed and injected from the nozzle Nz, an air gap is formed between the (n−1) layer and the n layer. In other words, the area of the contactable bottom surface of the n layer is smaller than the projection area of the n layer in the stacking direction and the area of the contactable top surface of the (n−1) layer is smaller than the projection area of the (n−1) layer in the stacking direction.

The area S shown in FIG. 9 is larger than the area S shown in FIG. 10. This is because the area in which the the contactable bottom surface of the n layer and the contactable front surface of the (n−1) layer overlap in the stacking direction when the angle formed by the movement direction of the nozzle Nz at the location B (n,k) and the movement direction of the nozzle Nz at the location B (n−1,k) is 90 degrees is smaller than the area in which the the contactable bottom surface of the n layer and the contactable front surface of the (n−1) layer overlap in the stacking direction when the angle formed by the movement direction of the nozzle Nz at the location A (n,k) and the movement direction of the nozzle Nz at the location A (n−1,k) is 0 degrees. In other words, the contact area between the n layer and the (n−1) layer changes according to the angle formed by the movement direction of the nozzle Nz at the location of the n layer and the movement direction of the nozzle Nz at the location of the (n−1) layer.

When the contact area between the (n−1) layer and the n layer is smaller, the heat of the modeling material X forming the n layer is harder to be transmitted to the modeling material X forming the (n−1) layer. Accordingly, when the temperature of the (n−1) layer is lower than the temperature necessary for fixing the n layer to the (n−1) layer, the n layer may be hard to be fixed onto the (n−1) layer. Here, for fixing the n layer to the (n−1) layer, a method of completely filling the air gap between the (n−1) layer and the n layer by injecting the modeling material X heated into the liquid state from the nozzle Nz is conceivable. However, in the method, changes in crystal structure of the (n−1) layer, degradation in material property of the (n−1) layer, etc. may be caused. As a result, the modeling precision of the (n−1) layer and the material strength of the three-dimensional modeled object may be lower.

Accordingly, in the embodiment, the relative movement velocity of the injection unit 10 to the stage 20 when the three-dimensional modeling apparatus 1 models the partial path at the location B (n,k) in FIG. 10 is set to a movement velocity lower than the relative movement velocity of the injection unit 10 to the stage 20 when the three-dimensional modeling apparatus 1 models the partial path at the location A (n,k) in FIG. 9. When the relative movement velocity of the injection unit 10 to the stage 20 is lower, even in a case where the contact area between the (n−1) layer and the n layer is smaller, the heat of the modeling material X forming the n layer is easily transmitted to the modeling material X forming the (n−1) layer. Accordingly, the n layer may be fixed onto the (n−1) layer more reliably.

Figure 11:
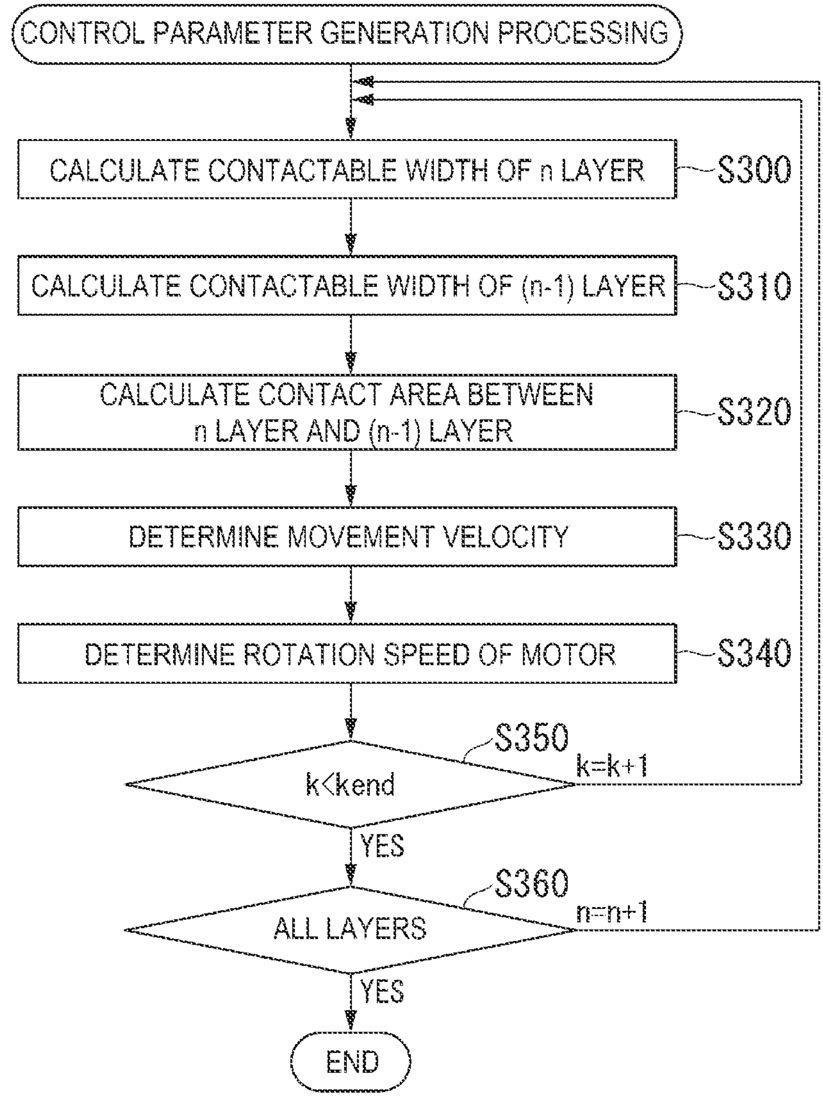
FIG. 11 shows an example of a flowchart of modeling data generation processing executed by the controller 40.
Figure 12:
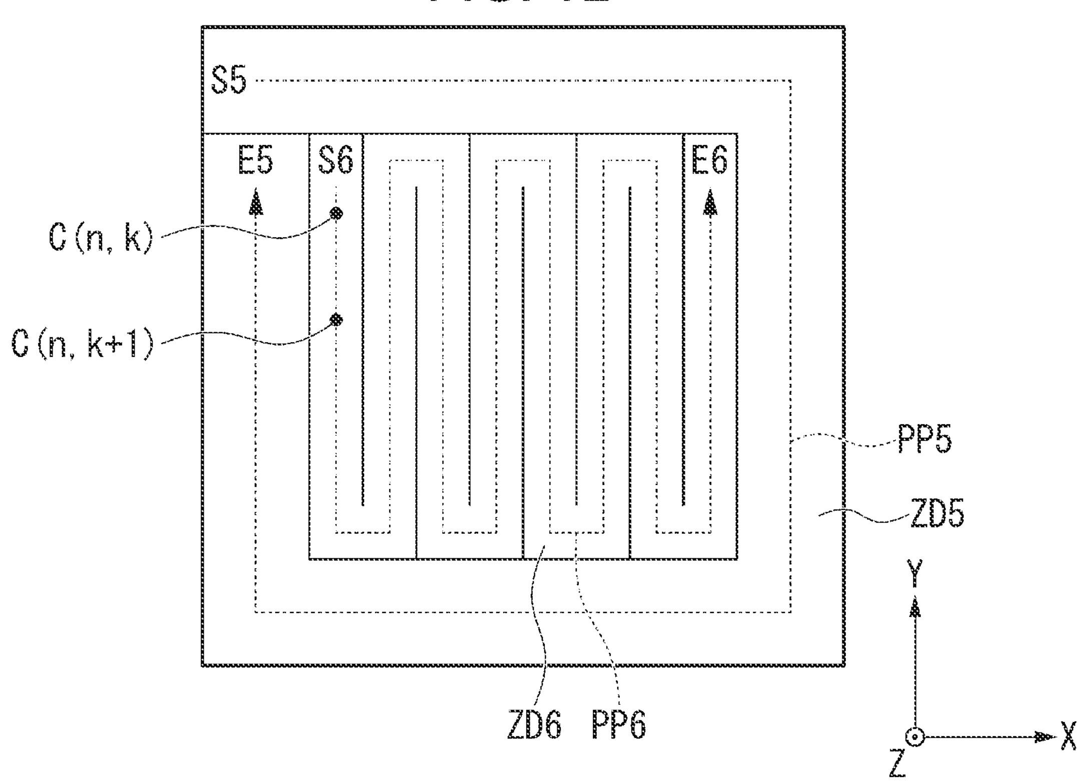
FIG. 12 shows an example of a planar shape of an n layer of a three-dimensional modeled object placed on the layer shown in FIG. 8.

In the embodiment, the controller 40 sets the relative movement velocity of the injection unit 10 to the stage 20 based on the angle formed by the movement direction of the nozzle Nz at the location of the n layer and the movement direction of the nozzle Nz at the location of the (n−1) layer. However, the controller 40 may set the relative movement velocity of the injection unit 10 to the stage 20 based on the width of the partial path at the location A (n, k). In this case, the partial path width data is an example of overlap extent information representing the extent of overlap between the modeling paths. FIG. 11 shows an example of a flowchart of modeling data generation processing executed by the controller 40. Here, in FIG. 11, a case where the initial value of n is 1 is explained as an example. FIG. 12 shows an example of a planar shape of the n layer of the three-dimensional modeled object placed on the layer shown in FIG. 8.

The layer data shown in FIG. 12 includes first modeling data and second modeling data.

FIG. 12 shows the example in which first modeling data ZD5 is represented by the outermost modeling path. The modeling path includes a plurality of partial paths PP5 for modeling the outer shell region. As described above, the respective partial paths PP5 are linear paths. Therefore, in FIG. 16, the first modeling data ZD5 is represented by continuous four partial paths PP5 shown by broken lines from a start point shown by "S5" to an end point shown by "E5". The respective partial paths PP5 are correlated with injection control data showing injection amounts for forming the modeling material X deposited on the stage 20 in a predetermined reference width Ss.

FIG. 12 shows the example in which second modeling data ZD6 is represented by a modeling path meandering in S-shapes. The data generation unit 51 generates data showing the modeling path filling the inner region as the second modeling data ZD6 by reciprocating the injection unit 10 along the Y directions and gradually moving the injection unit 10 in the X directions orthogonal to the Y directions in the XY-plane. The modeling path filling the inner region includes a plurality of partial paths PP6. As described above, the respective partial paths PP6 are linear paths. Therefore, in FIG. 16, the second modeling data ZD6 is represented by ten partial paths PP6 from a start point shown by "S6" to an end point shown by "E6". The respective partial paths PP6 are correlated with injection control data showing injection amounts for forming the modeling material X deposited on the stage 20 in a predetermined reference width Ss. Note that, in the embodiment, the width of the modeling path modeled in the first modeling data ZD5 is the reference width Ss and the width of the modeling path modeled in the second modeling data ZD6 is a half of the reference width Ss, however, these may be different widths.

In FIG. 12, the end point "E5" of the modeling path represented by the first modeling data ZD5 and the start point "S6" of the modeling path represented by the second modeling data ZD6 are shown in different positions, however, this is for the convenience of the illustration and these positions are actually the same position. Therefore, the modeling path represented by the first modeling data ZD5 the modeling path represented by the second modeling data ZD6 are continuously coupled. Note that these modeling paths may be divided. That is, the end point "E5" of the modeling path represented by the first modeling data ZD5 and the start point "S6" of the modeling path represented by the second modeling data ZD6 may be in different positions.

At step S300, the controller 40 calculates a contactable width of a bottom surface at a location C (n,k) based on the partial path width data. The contactable width is e.g., an 80% width of the width shown by the partial path width data at the location C (n,k). Note that the contactable width may be calculated from the injection amount parameter, the path thickness data, and the partial path width data. Or, for example, the contactable width may be a width smaller than 80% of the width shown by the partial path width data at the location C (n,k) or a width larger than 80% of the width shown by the partial path width data at the location C (n,k).

At step S310, the controller 40 calculates a contactable width of a front surface at a location C (n−1,k) based on the partial path width data. Coordinates of the nozzle Nz at the location C (n−1,k) are (30,30,5) and coordinates of the nozzle Nz at the location C (n,k) are (30,30,15). That is, as seen from the Z direction, the location C (n,k) overlaps with the location C (n−1,k).

Figure 13:
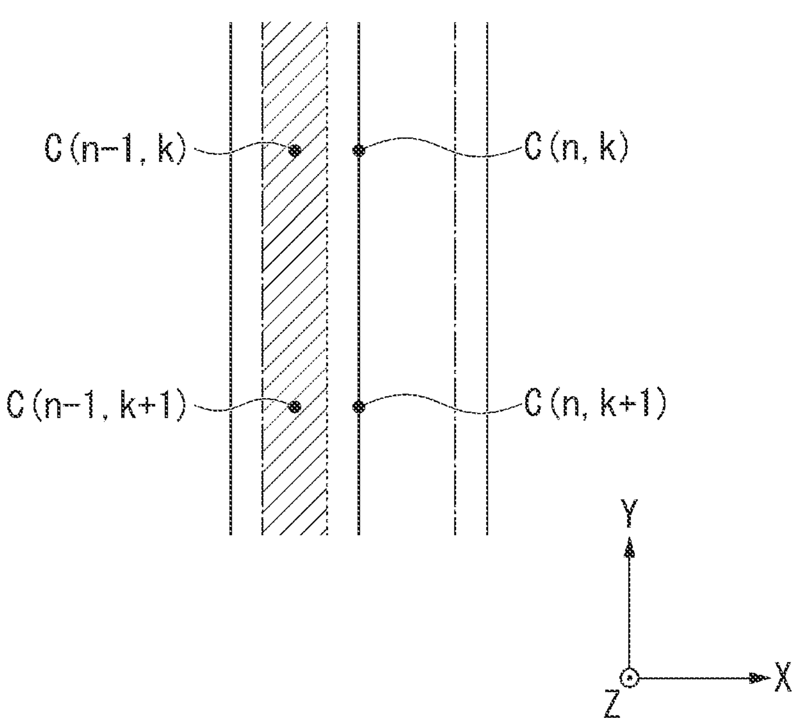
FIG. 13 is a diagram showing an area S when a width of path data at a location C (n,k) is a half of a reference width Ss.

At step S320, the controller 40 calculates an area S where the layer data at the location C (n,k) contacts the layer data at the location C (n−1,k). FIG. 13 is a diagram showing the area S when the width of the partial path at the location C (n,k) is a half of the reference width Ss. Note that, in FIG. 13, the area S is shown as an area within the hatched region. The area S is calculated based on the contactable width of the bottom surface at the location C (n,k) and the path data. In the embodiment, the area S is a value obtained by multiplication of the value obtained by subtraction of the path parameter PP (n,k) from the path parameter PP (n,k+1) by the contactable width of the bottom surface at the location C (n,k). The area S changes according to e.g., the width of the partial path at the location C (n,k).

At step S330, the controller 40 determines a relative movement velocity of the injection unit 10 to the stage 20. Specifically, the control parameter generation unit determines the relative movement velocity of the injection unit 10 to the stage 20 from the area S based on the correspondence information.

The correspondence information representing the relationship between the contact area between the n layer and the (n−1) layer and the movement velocity of the injection unit 10 is stored in the memory unit 42 as information in the table form, for example, as described above.

At step S340, the controller 40 determines the rotation speed of the flat screw 112. For example, the controller 40 determines the rotation speed of the flat screw 112 based on the injection control data and the movement velocity. In FIG. 11, the processing at step S340 is shown by "DETERMINE ROTATION SPEED OF MOTOR".

Here, the controller 40 repeatedly executes the processing from step S300 to step S340 with respect to each value of k as the argument of the path parameter PP. That is, the controller 40 repeatedly executes the processing from step S300 to step S340 with respect to each value of k as the argument of the path parameter PP sequentially from the processing from step S300 to step S340 for k=1, the processing from step S300 to step S340 for k=2, . . . . Thereby, the controller 40 may determine the relative movement velocity of the injection unit 10 to the stage 20 with respect to each of the plurality of partial paths.

At step S350, the controller 40 determines whether the processing from step S300 to step S340 is completed in the path data in the n layer. That is, at step S350, the controller 40 determines whether the processing from step S300 to step S340 is executed with respect to all values of k. In FIG. 11, the processing at step S350 is shown by "k<kend".

When the controller 40 determines that the processing is not completed at step S350, the controller 40 executes the processing from step S300 to step S350 with respect to the next value of k.

When the controller 40 determines that the processing is completed at step S350, the controller 40 ends the repetition of the processing from step S300 to step S350. Then, the controller 40 goes to step S360 and selects the next value of n, i.e., the next modeling layer. Note that, when there is no unselected modeling layer at step S360, the controller 40 ends the repetition of the processing from step S300 to step S360. In FIG. 11, the processing at step S360 is shown by "ALL LAYERS".

According to the above described three-dimensional modeling apparatus 1 of the embodiment, the relative movement velocity of the injection unit 10 to the stage 20 is set based on the contact area between the (n−1) layer and the n layer. Here, a relationship between the contactable width at the location C (n,k) with the movement velocity of the (n−1) layer and the n layer is explained. The area S shown in FIG. 9 is larger than the area S shown in FIG. 13. This is because the contactable width at the location A (n,k) shown in FIG. 9 is larger than the contactable width at the location C (n,k) shown in FIG. 13.

When the contact area between the (n−1) layer and the n layer is smaller, the heat of the modeling material X forming the n layer is harder to be transmitted to the modeling material X forming the (n−1) layer. Accordingly, when the temperature of the (n−1) layer is lower than the temperature necessary for fixing the n layer to the (n−1) layer, the n layer may be hard to be fixed onto the (n−1) layer. Here, for fixing the n layer to the (n−1) layer, a method of completely filling the air gap between the (n−1) layer and the n layer by injecting the modeling material X heated into the liquid state from the nozzle Nz is conceivable. However, in the method, changes in crystal structure of the (n−1) layer, degradation in material property of the (n−1) layer, etc. may be caused. As a result, the modeling precision of the (n−1) layer and the material strength of the three-dimensional modeled object may be lower.

Accordingly, in the embodiment, the relative movement velocity of the injection unit 10 to the stage 20 when the three-dimensional modeling apparatus 1 models the partial path at the location C (n,k) in FIG. 13 is set to a movement velocity lower than the relative movement velocity of the injection unit 10 to the stage 20 when the three-dimensional modeling apparatus 1 models the partial path at the location A (n,k) in FIG. 9. When the relative movement velocity of the injection unit 10 to the stage 20 is lower, even in a case where the contact area between the (n−1) layer and the n layer is smaller, the heat of the modeling material X forming the n layer is easily transmitted to the linear portion forming the (n−1) layer. Accordingly, the three-dimensional modeling apparatus 1 may fix the n layer onto the (n−1) layer more reliably.

As described above, certain path data contains partial path width data in the respective positions on the modeling path. Here, when stacking the n layer on the (n−1) layer, the three-dimensional modeling apparatus 1 changes the distance between the top surface of the (n−1) layer and the tip of the nozzle Nz, and thereby, changes the width of the modeling material X injected to the top surface of the (n−1) layer. Note that the maximum value of the width of the modeling material X injected to the top surface of the (n−1) layer by the three-dimensional modeling apparatus 1 is the outer diameter of the tip of the nozzle Nz. This is because, if the distance between the top surface of the (n−1) layer and the tip of the nozzle Nz is set to be smaller than the inner diameter of the tip of the nozzle Nz, the modeling material X injected from the tip of the nozzle Nz is crushed and injected to the top surface of the (n−1) layer by the tip of the nozzle Nz.

Or, the three-dimensional modeling apparatus 1 may have a configuration of setting the movement velocity of the injection unit 10 based on the width of the partial path and the correspondence information in place of the configuration of calculating the area S based on the width of the partial path and setting the movement velocity of the injection unit 10 based on the calculated area S and the correspondence information. In this case, the correspondence information is information in which the information representing the width of the partial path is correlated with the velocity information. Further, in this case, the information representing the width of the partial path is an example of overlap extent information representing an extent of overlap between modeling paths.

Note that the data generator 50 may be integrally formed with the controller 40. Or, the data generator 50 may be provided in the three-dimensional modeling apparatus 1.

The configurations described as above may be combined in any manner.

The above described controller 40 may change the movement velocity according to the type of the (n−1) layer when the modeling material X is injected as the n layer by the injection unit 10. The type of the modeling layer includes e.g., the modeling surface 21, a raft layer, a solid layer of the modeled object, the modeling layer of the modeled object, a solid layer of a supporting object, or a support layer of the supporting object. The modeled object refers to a portion separated from the N modeling layers as one three-dimensional modeled object of the portions of the stacked N modeling layers. The supporting object refers to a portion except the portion separated from the N modeling layers as one three-dimensional modeled object of the portions of the stacked N modeling layers.

As described above, a controller according to the embodiment includes a processor controlling a three-dimensional modeling apparatus including a stage, an injection unit injecting a modeling material onto the stage, and a movement unit relatively moving the stage and the injection unit, and a memory unit in which modeling path information and correspondence information are stored, wherein the modeling path information is information representing respective modeling paths of N modeling layers formed using the modeling material injected from the injection unit, N is an integer equal to or larger than 1, the correspondence information is information in which overlap extent information representing an extent of overlap of the modeling paths and velocity information representing a relative movement velocity of the injection unit to the stage are correlated, the processor performs modeling control to model a three-dimensional modeled object in a predetermined shape by injecting the modeling material onto the stage using the injection unit and stacking the N modeling layers, and the modeling control includes movement velocity control to determine the movement velocity when the respective N modeling layers are formed by the injection unit based on the modeling path information and the correspondence information. Thereby, the controller may suppress lowering of the interlayer strength between the modeling layers stacked by the three-dimensional modeling apparatus. Here, in the above described example, the controller 40 is an example of the controller. In the above described example, the stage 20 is an example of the stage. In the above described example, the modeling material X is an example of the modeling material. In the above described example, the injection unit 10 is an example of the injection unit. In the above described example, the movement unit 30 is an example of the movement unit. In the above described example, the three-dimensional modeling apparatus 1 is an example of the three-dimensional modeling apparatus. In the above described example, the processor 41 is an example of the processor. In the above described example, the memory unit 42 is an example of the memory unit.

In the controller, the correspondence information may include first correspondence information in which first overlap extent information representing a predetermined first extent as the extent of overlap and first velocity information representing a predetermined first velocity as the movement velocity are correlated, and second correspondence information in which second overlap extent information representing a second extent smaller than the first extent as the extent of overlap and second velocity information representing a second velocity lower than the first velocity as the movement velocity are correlated.

Further, in the controller, the correspondence information may be information in a table form including a record containing the first correspondence information and a record containing the second correspondence information.

Furthermore, in the controller, the correspondence information may be a function of correlating the overlap extent information with the velocity information.

As above, the embodiment of the present disclosure is described in detail with reference to the drawing, however, the specific configuration is not limited to the embodiment and changes, replacements, deletions, etc. may be made without departing from the scope of the present disclosure.

A program for realizing functions of arbitrary configuration units in the above described apparatus may be recorded in a computer-readable recording medium and the program may be read and executed in a computer system. Here, the apparatus is e.g., the three-dimensional modeling apparatus 1, the controller 40, the data generator 50, or the like. "Computer system" here includes an OS (Operating System) and hardware such as a peripheral device. Further, "computer-readable recording medium" refers to a portable medium such as a flexible disk, a magnetooptical disk, a ROM, or a CD (Compact Disk)-ROM or a memory device such as a hard disk provided inside of the computer system. Furthermore, "computer-readable recording medium" includes a medium holding a program in a fixed time like a volatile memory inside of the computer system as a server or a client when the program is transmitted via a network such as the Internet or a communication line such as a phone line.

The program may be transmitted from a computer system storing the program in the memory device or the like to another computer system via a transmission medium or transmission wave in the transmission medium. Here, "transmission medium" transmitting the program refers to a medium having a function of transmitting information like a network such as the Internet or a communication line such as a phone line.

Further, the program may realize part of the above described functions. Furthermore, the program may be the so-called differential file or differential program that may realize the above described functions by a combination with a program already recorded in the computer system.

What is claimed is:

1. A controller comprising:

a processor controlling a three-dimensional modeling apparatus including a stage, an injection unit injecting a modeling material onto the stage, and a movement unit relatively moving the stage and the injection unit; and a memory unit in which modeling path information and correspondence information are stored, wherein the modeling path information is information representing respective modeling paths of N modeling layers formed using the modeling material injected from the injection unit, N is an integer larger than 1, the correspondence information is information in which overlap extent information representing an extent of overlap of the modeling paths and velocity information representing a relative movement velocity of the injection unit to the stage are correlated, the overlap extent information being based, in part, on angle data representing an angle formed by vectors at different locations along the modeling paths, the processor performs modeling control to model a three-dimensional modeled object in a predetermined shape by injecting the modeling material onto the stage using the injection unit and stacking the N modeling layers, and the modeling control includes movement velocity control to determine the movement velocity when the respective N modeling layers are formed by the injection unit based on the modeling path information and the correspondence information.

2. The controller according to claim 1, wherein the correspondence information includes first correspondence information in which first overlap extent information representing a predetermined first extent as the extent of overlap and first velocity information representing a predetermined first velocity as the movement velocity are correlated, and second correspondence information in which second overlap extent information representing a second extent smaller than the first extent as the extent of overlap and second velocity information representing a second velocity lower than the first velocity as the movement velocity are correlated.

3. The controller according to claim 2, wherein the correspondence information is information in a table form including a record containing the first correspondence information and a record containing the second correspondence information.

4. The controller according to claim 2, wherein the correspondence information is a function of correlating the overlap extent information with the velocity information.

5. The controller according to claim 2, wherein the processor specifies a direction of the modeling path in each position on the modeling path of a first modeling layer of the N modeling layers and a direction of the modeling path in each position on the modeling path of a second modeling layer stacked on the first modeling layer, and determines the extent of overlap with respect to the second modeling layer based on the specified directions in the movement velocity control.

6. The controller according to claim 5, wherein the processor determines the extent of overlap with respect to the second modeling layer based on the direction of the modeling path of the second modeling layer and the direction of the modeling path of the first modeling layer with respect to each of one or more overlap positions in which the modeling path of the second modeling layer and the modeling path of the first modeling layer overlap, and determines the movement velocity when the second modeling layer is formed by the injection unit based on the extent of overlap with respect to the second modeling layer determined with respect to each of one or more overlap positions and the correspondence information in the movement velocity control.

7. The controller according to claim 2, wherein the processor specifies a width of the modeling path in each position on the modeling path of a third modeling layer of the N modeling layers and a width of the modeling path in each position on the modeling path of a fourth modeling layer stacked on the third modeling layer based on the modeling path information, and determines the extent of overlap with respect to the fourth modeling layer based on the specified widths in the movement velocity control.

8. A controller comprising:

a processor controlling a three-dimensional modeling apparatus including a stage, an injection unit injecting a modeling material onto the stage, and a movement unit relatively moving the stage and the injection unit; and a memory unit in which modeling path information and correspondence information are stored, wherein the modeling path information is information representing respective modeling paths of N modeling layers formed using the modeling material injected from the injection unit, N is an integer larger than 1, the correspondence information is information in which overlap extent information representing an extent of overlap of the modeling paths and width information representing a width of the modeling path are correlated, the overlap extent information being based, in part, on angle data representing an angle formed by vectors at different locations along the modeling paths, the processor performs modeling control to model a three-dimensional modeled object in a predetermined shape by injecting the modeling material onto the stage using the injection unit and stacking the N modeling layers, and the modeling control includes width control to determine the width of the modeling path when the respective N modeling layers are formed by the injection unit based on the modeling path information and the correspondence information.

9. A three-dimensional modeling apparatus comprising:

a stage;

an injection unit injecting a modeling material onto the stage;

a movement unit relatively moving the stage and the injection unit; and a controller, wherein the controller includes a processor controlling the injection unit and the movement unit, and a memory unit in which modeling path information and correspondence information are stored, the modeling path information is information representing respective modeling paths of N modeling layers formed using the modeling material injected from the injection unit, N is an integer larger than 1, the correspondence information is information in which overlap extent information representing an extent of overlap of the modeling paths and velocity information representing a relative movement velocity of the injection unit to the stage are correlated, the overlap extent information being based, in part, on angle data representing an angle formed by vectors at different locations along the modeling paths, the processor performs modeling control to model a three-dimensional modeled object in a predetermined shape by injecting the modeling material onto the stage using the injection unit and stacking the N modeling layers, and the modeling control includes movement velocity control to determine the movement velocity when the respective N modeling layers are formed by the injection unit based on the modeling path information and the correspondence information.

* * * * *